United States Patent
Manam et al.

(10) Patent No.: US 11,568,692 B2
(45) Date of Patent: Jan. 31, 2023

(54) SYSTEM AND A METHOD FOR ACTIVATING A PRIVACY STATUS OF A LOCK

(71) Applicant: Carrier Corporation, Palm Beach Gardens, FL (US)

(72) Inventors: HarishBabu Manam, Telangana (IN); Ramesh Lingala, Telangana (IN); Srinivas Korrawat, Telangana (IN); Adam Kuenzi, Salem, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/116,153

(22) Filed: Dec. 9, 2020

(65) Prior Publication Data

US 2021/0256786 A1    Aug. 19, 2021

(30) Foreign Application Priority Data

Feb. 14, 2020  (IN) .............................. 202011006521

(51) Int. Cl.
*G07C 9/00* (2020.01)
*G06F 3/01* (2006.01)
(Continued)

(52) U.S. Cl.
CPC ......... *G07C 9/00563* (2013.01); *G06F 3/017* (2013.01); *G10L 25/51* (2013.01); *H04L 12/282* (2013.01)

(58) Field of Classification Search
CPC .......... G06F 3/017; G06F 16/22; G06F 16/51; G06F 16/583; G06F 16/5866; G06F 1/163; G06F 21/6245; G06F 3/002; G06F 3/005; G06F 3/1454; G06F 3/16; G06F 3/167; G06Q 10/0631; G06Q 50/12; G06Q 50/163; G06Q 10/083; G06Q 10/103; G06Q 30/0631; G07C 9/00563; G07C 2009/00507; G07C 9/00309; G07C 9/00571; G10L 25/51; G05B 15/02; G06K 7/10366; G06K 9/00335; G06K 9/00355; G06K 9/00389; G06K 9/00664; G06K 9/00671; G06K 9/00684; G06K 9/00718;
(Continued)

(56) References Cited

U.S. PATENT DOCUMENTS 6,236,303 B1 * 5/2001 Wagner .................... G08B 5/36
340/286.08
10,555,274 B1 * 2/2020 Roosli .................. H04B 17/318
(Continued)

OTHER PUBLICATIONS

European Search Report for Application No. 20213597.6; dated Jun. 10, 2021; 6 Pages.

*Primary Examiner* — Dionne Pendleton
(74) *Attorney, Agent, or Firm* — Cantor Colburn LLP (57) ABSTRACT

Aspects of the invention are directed towards a system and a method for activating a privacy status of a lock. One or more embodiments of the invention describe the method comprising steps of capturing activity information of a user by a user device. The method also describes steps of analyzing the captured activity information and determining a busy status of the user based on the analysis. The method further describes steps of transmitting the busy status of the user to a lock for activating a privacy status of the lock.

20 Claims, 8 Drawing Sheets

(51) Int. Cl.
*G10L 25/51* (2013.01)
*H04L 12/28* (2006.01)

(58) Field of Classification Search
CPC ........ G06K 9/20; G06K 9/209; G06K 9/4604;
G06K 9/6267; G06K 10/0631; G06K
10/083; G06K 10/103; G06K 30/0631;
G08B 19/005; G08B 21/18; G08B
25/008; G08B 27/003; G08B 29/185;
G08B 5/36; H04L 65/4069; H04L 65/61;
H04L 12/2827; H04M 19/047; H04M
2250/12; H04M 3/537; H04N 1/00342;
H04N 5/2256; H04N 5/23203; H04N
5/23206; H04N 5/23222; H04N 5/23245;
H04N 5/332; H04N 7/147; H04N 7/15;
H04N 7/185; H04W 24/02; H04W 4/02;
H04W 4/029; G06V 10/10; G06V 10/147;
G06V 10/44; G06V 20/10; G06V 20/20;
G06V 20/35; G06V 20/41; G06V 40/113;
G06V 40/20; G06V 40/28; G06V 10/764;
G06V 20/59
See application file for complete search history.

(56) References Cited

U.S. PATENT DOCUMENTS

| | | | |
|---|---|---|---|
| 10,726,650 B1* | 7/2020 | Giles | G08B 25/008 |
| 11,361,060 B1* | 6/2022 | Lyman | G10L 17/08 |
| 2015/0116106 A1* | 4/2015 | Fadell | G08B 19/005 |
| | | | 340/501 |
| 2016/0080364 A1* | 3/2016 | Karimzadeh | G16H 10/60 |
| | | | 726/6 |
| 2016/0300415 A1* | 10/2016 | Deneen | G07C 9/00571 |
| 2016/0300474 A1 | 10/2016 | Warren et al. | |
| 2017/0118660 A1* | 4/2017 | Griffin | H04W 24/02 |
| 2017/0192401 A1* | 7/2017 | Wexler | G06K 9/00671 |
| 2020/0128594 A1* | 4/2020 | Shantharam | H04W 48/16 |

* cited by examiner

SYSTEM AND A METHOD FOR ACTIVATING A PRIVACY STATUS OF A LOCK

CROSS-REFERENCE TO RELATED APPLICATIONS

This application claims priority to Indian Patent Application No. 202011006521, filed Feb. 14, 2020, the contents of which are incorporated by reference herein in their entirety.

BACKGROUND

The present invention generally relates to security systems. More particularly, the invention relates to a user device, a system and a method for activating a privacy status of a lock.

Privacy is a concern for guests staying in hotels or any commercial residential premises. Many a times privacy of a guest may be breached by a hotel personnel like the house keeping staff or any such another person. To avoid such intrusion, the hotels give guests/users the option of using a "do-not-disturb" tag outside the door or physically turn on the privacy knob of the door.

Placing the "do-not-disturb" tag at the lock of the room is a manual process and requires efforts from the user. At times, the user may forget to put the do-not-disturb tag which may result in disturbing the user or putting the user in an awkward situation. At present, there does not exist any solution for automatically indicating not to disturb the user inside the room or for automatically indicating outside the room that the user in the room is currently busy. Also, there does not exit any solution for automatically determining if the user inside the room is busy.

In view of the afore-mentioned problems in the existing solutions, there is a need of an effective solution for automatically determining if a user inside a room is busy. There is also a requirement of an effective solution for automatically indicating that a user present inside a room is currently busy. In order to solve the problems in the existing solutions, a user device, a system and a method are disclosed.

SUMMARY OF THE INVENTION

Various embodiments of the invention describe a user device for triggering a privacy status of a lock. The user device comprises a detection unit adapted to capture activity information of a user. The user device also comprises an analyzer adapted to analyze the captured activity information and determine a busy status of the user based on the analysis. The user device comprises a communication unit adapted to transmit the busy status of the user to a lock for activating a privacy status of the lock.

In an embodiment of the invention, the detection unit captures the activity information automatically using one or more sensors placed inside or outside the user device.

In a different embodiment of the invention, the activity information comprises gestures by the user applied on the user device.

In another embodiment of the invention, the gestures comprise moving the user device by the user in a predefined manner, wherein the user provides gestures when the user is busy.

In yet another embodiment of the invention, the analyzer is adapted to determine the busy status associated with the user when the user device is set in do-not-disturb mode.

In another embodiment of the invention, the analyzer is adapted to determine the busy status associated with the user based on sleeping activity information of the user using an accelerometer of the user device or sound waves emitted by the user device.

In yet another embodiment of the invention, the lock receives the busy status from an occupancy sensor. The occupancy sensor determines the busy status associated with the user based on an occupancy activity information of the user.

In still another embodiment of the invention, the lock is located on a door of a premises and the user is present inside the premises.

In a different embodiment of the invention, the lock activates the privacy status by providing a notification to other users accessing a premises to alert the other users regarding the busy status of the user using voice alert and/or light emitting diode (LED) indicator.

In an embodiment of the invention, the user device is adapted to provide a notification to the user for activating the privacy status before transmitting the busy status to the lock.

In another embodiment of the invention, the user device is adapted to receive a time duration from the user for activating the privacy status during the time duration specified by the user.

In yet another embodiment of the invention, the lock receives the time duration from the user device for activating the privacy status, wherein the lock comprises an interface to display time left for expiration of the time duration.

Various embodiments of the invention describe a method for triggering a privacy status of a lock. The method comprises steps of capturing activity information of a user by a user device. The method also comprises steps of analyzing the captured activity information and determining a busy status of the user based on the analysis. The method further comprises steps of transmitting the busy status of the user to a lock for activating a privacy status of the lock.

In an embodiment of the invention, the user device captures the activity information automatically using one or more sensors placed inside or outside the user device.

In a different embodiment of the invention, the activity information comprises gestures by the user applied on the user device. The gestures comprise moving the user device by the user in a predefined manner.

In an embodiment of the invention, the user device determines the busy status associated with the user when the user device is set in do-not-disturb mode.

In another embodiment of the invention, the user device is adapted to determine the busy status associated with the user based on sleeping activity information of the user using an accelerometer of the user device or sound waves emitted by the user device.

In yet another embodiment of the invention, the lock receives the busy status from an occupancy sensor. The occupancy sensor determines the busy status associated with the user based on an occupancy activity information of the user.

In another embodiment of the invention, the lock is located on a door of a premises and the user is present inside the premises. Also, the lock activates the privacy status by providing a notification to other users accessing a premises to alert other users regarding the busy status of the user using voice alert and/or light emitting diode (LED) indicator.

In a different embodiment of the invention, a system is disclosed for triggering a privacy status of a lock. The system comprises a user device and a lock. The user device comprises a detection unit adapted to capture activity information of a user and an analyzer adapted to analyze the captured activity information and to determine a busy status of the user based on the analysis. The user device also comprises a communication unit adapted to transmit the busy status of the user to a lock for activating a privacy status of the lock. The lock comprises a receiver adapted to receive the busy status of the user from the user device and an activation unit adapted to activate the privacy status of the lock based on the busy status of the user.

In an embodiment of the invention, the lock is adapted to receive a time duration specified by the user from the user device for activating the privacy status, wherein the lock comprises an interface to display time left for expiration of the time duration.

In another different embodiment of the invention, a computer readable medium is disclosed for triggering a privacy status of a lock. The computer readable medium comprises one or more processors and a memory is coupled to the one or more processors, the memory stores instructions executed by the one or more processors. The one or more processors are configured to capture activity information of a user by a user device. The one or more processors are also configured to analyze the captured activity information and determine a busy status of the user based on the analysis. The one or more processors are further configured to transmit the busy status of the user to a lock for activating a privacy status of the lock.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention. The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

Corresponding reference numerals indicate corresponding parts throughout the drawings.

DETAILED DESCRIPTION

Described herein is a technology with a system and a method for activating a privacy status of a lock. A user may be present inside a premises and may be busy in some activities such as eating food, sleeping, using restroom, or attending a meeting. When the user is busy in these activities, a user device of the user may automatically capture information of these activities using one or more sensors placed inside or outside the user device. Further, the user device may analyze the captured information of these activities to determine a busy status of the user. The analysis of the captured activities information is performed to determine if the user present inside the premises is busy or not. Also, the busy status of the user may be communicated to a lock located on a door of the premises for activating a privacy status associated with the lock.

On receiving the busy status of the user, the lock may activate the privacy status associated with the lock. The activation of the privacy status would restrict other users from accessing the premises. In addition, the lock may further indicate the other users regarding the busy status of the user using voice alert and/or through light emitting diode (LED) indicator provided on the lock.

As used herein, the lock may be located on a door of the premises and may comprise a privacy knob. Also, the lock may have capability to communicate with the user device or a front desk system (FDS) through a network. The lock may be an electronic lock, a smart lock, an electro-mechanical lock or any such lock as understood by a person skilled in the art. Also, the premises can be a building, or a room with a door where the lock can be installed. Also, the premises can be a floor having a door where the lock can be installed.

As used herein, the user device is associated with the user and may store one or more applications. Such an application may perform operations/functions (such as analyze the captured activity information, determine a busy status of the user etc.) as described herein in the specification. Further, the application may be capable of computing and analyzing the activity information. The user device may be a desktop computer or a handheld device such as a mobile phone with network connectivity. Example of the user device includes a desktop, workstation PC, a laptop, a smart phone, a tablet, a wearable device and the like.

As used herein, the network may refer to a wired network, a mesh network, a cellular network (such as Global System for Mobile (GSM) network, a Long-Term Evolution (LTE) network, a code-division multiple access (CDMA) network, a narrow-band interne of thing (NB-IoT) technique or category M1 technique)), a short-range network (a WiFi network, a ZigBee network, a bluetooth network, or a near-field communication technique) or any such network/technique that is known in the art.

Figure 1A:
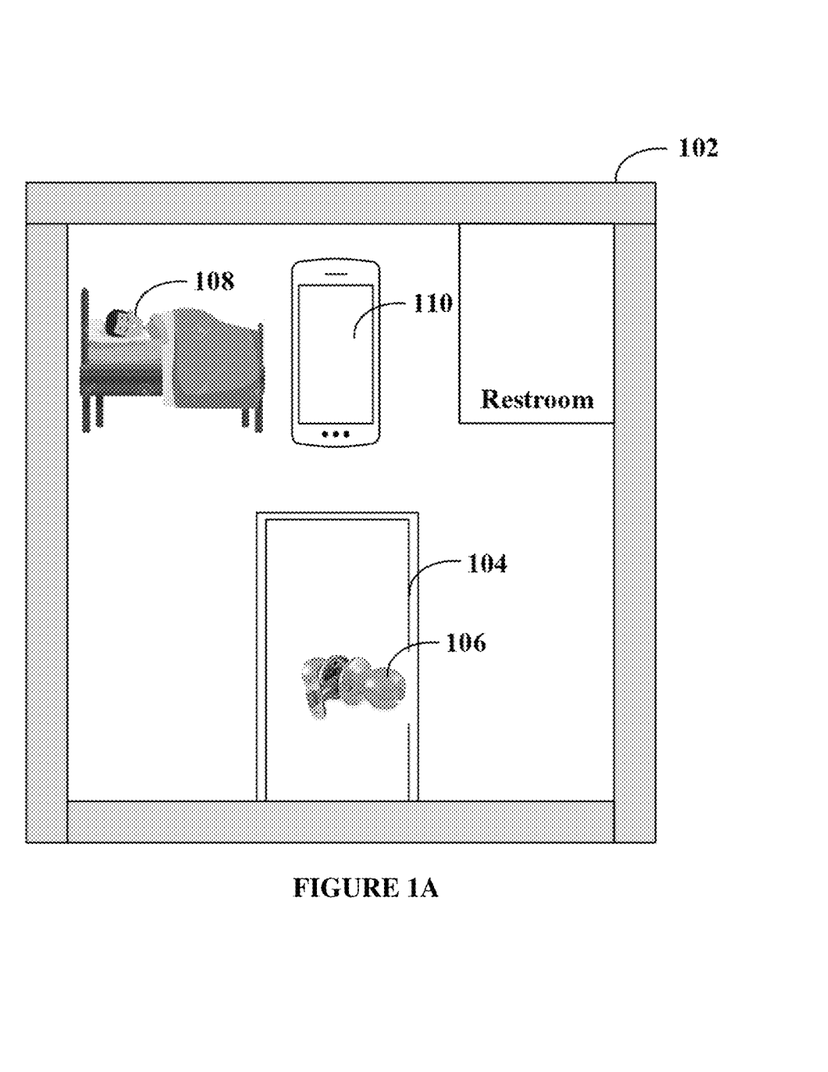
FIG. 1A-FIG. 1E depicts various exemplary activities of a user and information captured for these activities of the user according to various exemplary embodiments of the invention.

FIG. 1A depicts an exemplary first activity of a user and information captured for first activity of the user according to an exemplary embodiment of the invention. As depicted, a user 108 may be present inside a premises 102 and the user 108 may be involved in a sleeping activity. Also, a user device 110 of the user 108 may also present inside the premises 102 and automatically capture information of the sleeping activity of the user 108. For this, the user device 110 may use an accelerometer (i.e. a sensor) present inside the user device 110 to capture movements of the user 108 present inside the premises 102 while the user 108 is involved in the sleeping activity. An application stored in the user device 110 may then analyze the captured activity information (i.e. movements) of the user 108 to determine if the user 108 is sleeping or moving inside the premises 102. For an instance, if the user 108 is moving/walking inside the premises 102, the accelerometer would sense movements (or displacement from one point to another point) of the user 108 present inside the premises 102. Then, the application may analyze the movements of the user 108 captured by the accelerometer. For this, the application may check if there is any change in displacement of the user 108 from one point to another point. In an exemplary alternative embodiment, the user device 110 may use a global positioning system (GPS) present inside the user device 110 to capture movements of the user 108 present inside the premises 102.

If the accelerometer of the user device 110 does not capture any movements of the user 108 within a predetermined time period, the application in the user device 110 may determine that the user 108 is involved in the sleeping activity or taking rest and does not want to get disturbed. Thereby, the application in the user device 110 may determine a busy status of the user 108 based on the analysis of the captured information of the sleeping activity of the user 108 from accelerometer. As an example, the application may determine that the user 108 is busy in the sleeping activity if the accelerometer of the user device 110 does not sense any movements of the user 108 within the pre-defined period of time (say for, 30 minutes).

In an alternative exemplary embodiment, the user device 110 may use sound waves emitted by the user device 110 to capture information of the sleeping activity of the user 108 to determine the busy status of the user 108.

Figure 1B:
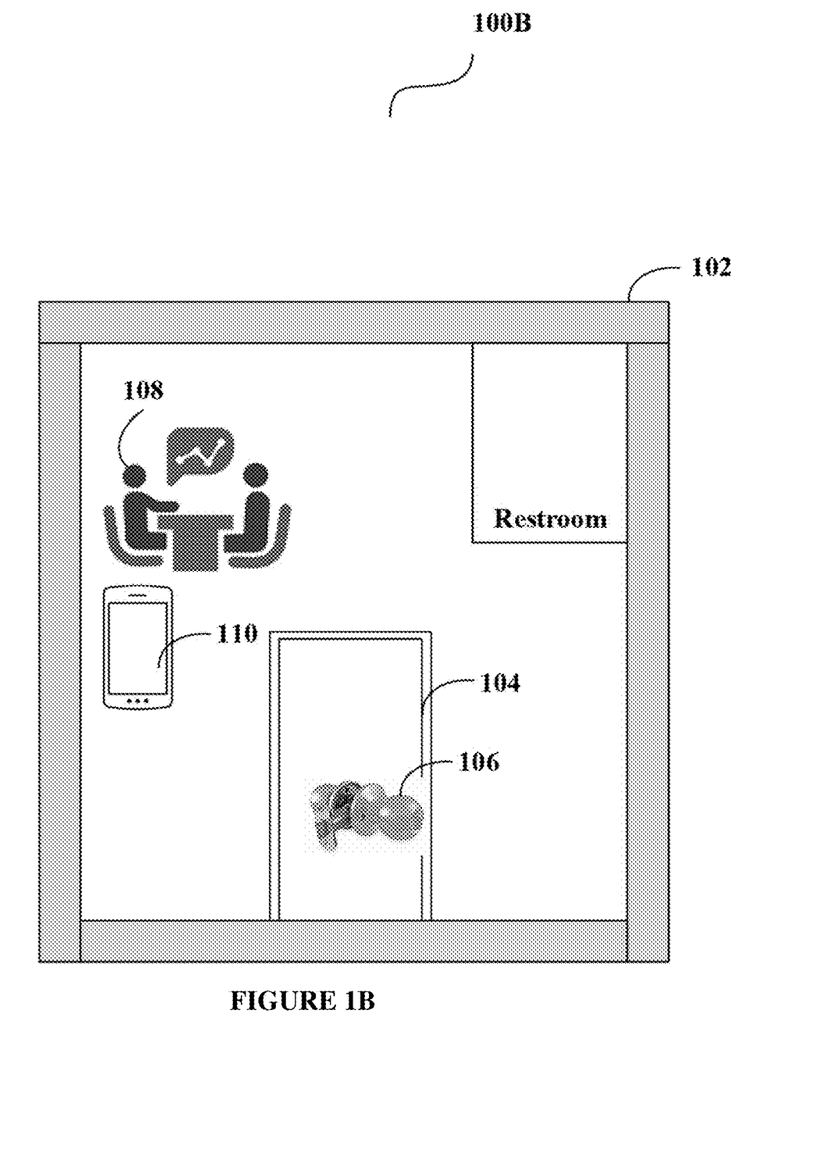

FIG. 1B depicts an exemplary second activity of a user and information captured for second activity according to an exemplary embodiment of the invention. As depicted, the user 108 is involved in a meeting activity with other person present inside the premises 102. The user device 110 may automatically capture information of the meeting activity of the user 108. For this, the user 108 may apply one or more gestures on the user device 110. For applying the one or more gestures on the user device 110, the user 108 may move the user device 110 in a pre-defined manner. For an instance, the user 108 may shake the user device 110 for 5 seconds by tightly holding the user device 110 in a hand. In another instance, the user 108 may tap two fingers on an interface of the user device 110 at consecutive three-times. These kinds of gestures applied by the user 108 on the use device 110 may be automatically captured by motion sensor/s or touch sensor/s of the user device 110. Different types of gestures which can be applied on the user device 110 and known to a person skilled in the art are within the scope of this disclosure. Alternatively, a meeting activity of the user 108 may also be captured through a calendar application stored in the user device 110. For an instance, if the user 108 has a meeting scheduled on a particular day and time during a period when the user 108 is present inside the premises 102. Such meeting activity of the user 108 would be captured by the user device 110 along with the gesture/s applied by the user 108 on the use device 110.

The application in the user device 110 may analyze the captured activity information (i.e. gesture/s) of the user 108 by determining if the user 108 has correctly applied gesture/s on the user device 110 in a pre-defined manner. Also, the application in the user device 110 may analyze the captured information of the meeting scheduled in the calendar application. Based on the analysis of the captured information of the meeting activity, the application in the user device 110 may determine that the user 108 is busy in the meeting activity. Thus, the application in the user device 110 determines a busy status of the user 108 based on the analysis of the captured information of the meeting activity of the user 108.

Figure 1C:
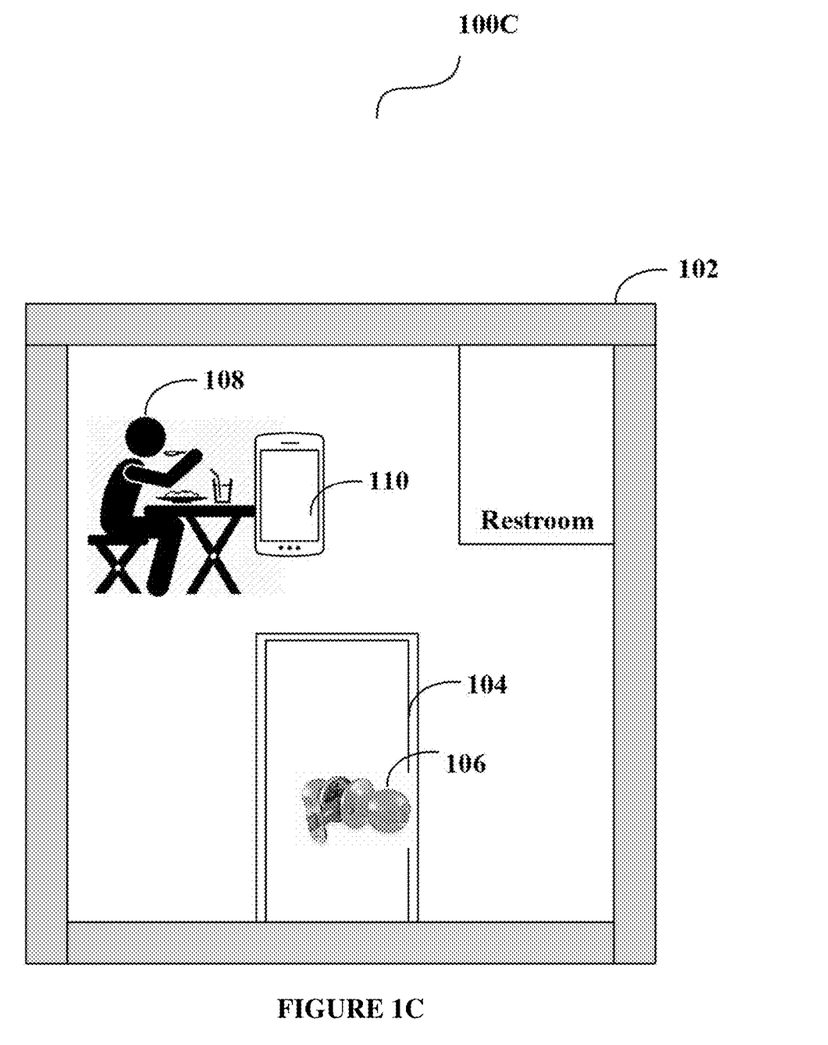

FIG. 1C depicts an exemplary third activity of a user and information captured for third activity of the user according to an exemplary embodiment of the invention. As depicted, the user 108 is involved in an eating activity present inside the premises 102. The user device 110 may automatically capture information of the eating activity of the user 108 through one or more gestures applied on the user device 110 by the user 108 as explained in FIG. 1B above. The application in the user device 110 may analyze the captured activity information (i.e. gesture/s) of the user 108 by determining if the user 108 has correctly applied gesture/s on the user device 110 in a pre-defined manner. Based on the analysis of the captured information of the eating activity, the application in the user device 110 may determine that the user 108 is busy in the eating activity since the user 108 has correctly applied gesture/s on the user device 110 in the pre-defined manner. Thus, the application in the user device 110 determines a busy status of the user 108 based on the analysis of the captured information of the eating activity of the user 108.

Figure 1D:
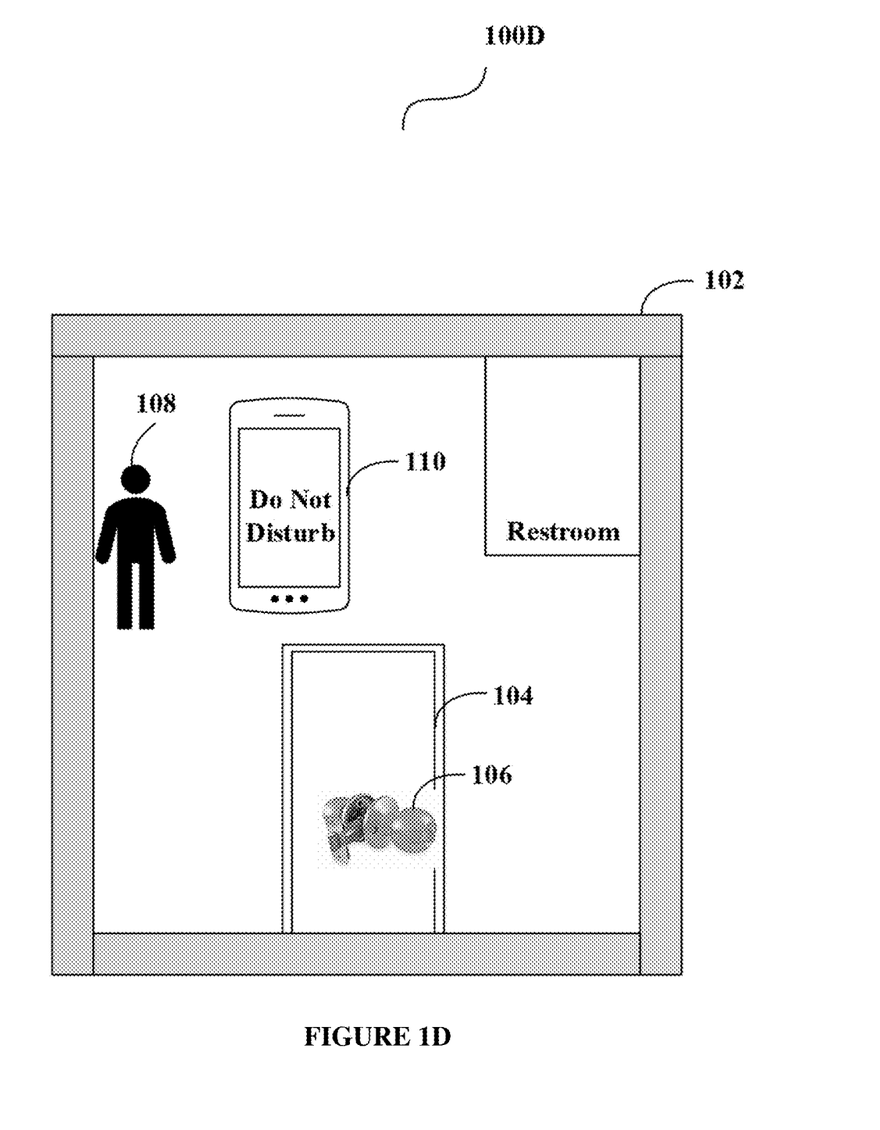

FIG. 1D depicts an exemplary fourth activity of a user and information captured for fourth activity of the user according to an exemplary embodiment of the invention. As depicted, the user 108 present inside the premises 102 may set the user device 110 in do-not-disturb mode (i.e. do-not-disturb mode activity) as provided in the user device 110. In another exemplary embodiment, the user 108 present inside the premises 102 may set the do-not-disturb mode using an option provided in an application stored in the user device 110. In an exemplary embodiment, the concierge or premises/hotel application are different from the application which performs the features of the application as described herein. In another exemplary embodiment, the features of the present invention may be incorporated in concierge or premises/hotel application. The application executing on the user device 110 may automatically capture information of the do-not-disturb mode set by the user 108 either on the user device 110 or through the application as explained above. Based on the analysis of the captured information of the do-not-disturb mode by checking of the do-not-disturb mode is set by the user 108, the application in the user device 110 may determine that the user 108 is busy and thus, the application in the user device 110 determines a busy status of the user 108.

Figure 1E:
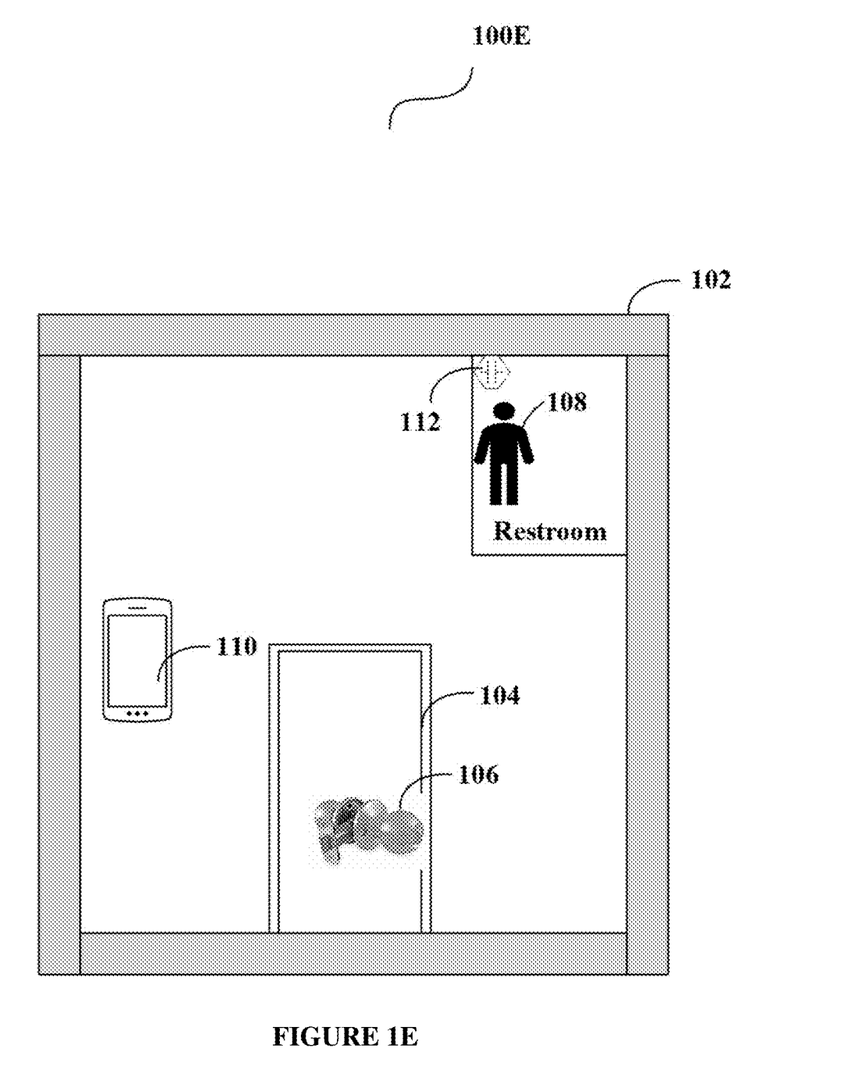

FIG. 1E depicts an exemplary fifth activity of a user and information captured for fifth activity of the user according to an exemplary embodiment of the invention. As depicted, the user 108 is present inside the premises 102 and the user 108 is involved in an occupancy activity in a restroom of the premises 102. An occupancy sensor 112 is installed in the restroom of the premises 102 to capture/sense occupancy/presence of the user 108 in the restroom of the premises 102. Such occupancy sensor 112 may capture information (i.e. occupancy/presence of the user 108) of the occupancy activity of the user 108 inside the restroom and transmit the same to the user device 110. Based on the analysis of the captured information of the occupancy activity, the application in the user device 110 may determine that the user 108 is busy in the restroom occupancy activity. The occupancy sensor 112 may also directly communicate the occupancy of the user 108 to a lock 106. Embodiments of the present invention mentioned in FIGS. 1A-1E provides a technical advantage of automatically determining whether a user inside a premises is busy.

When the application in the user device 110 determine a busy status of the user 108 as explained in FIGS. 1A-1E above, the present invention encompasses the user device 110 to transmit the busy status of the user 108 to a lock 106 for activating a privacy status of the lock 106. The user device 110 may transmit the busy status to the lock 106 through a mesh network, a cellular network, or a short-range network. Furthermore, before transmitting the busy status of the user 108 to the lock 106, the user device 110 may also provide a notification to the user 108 for activating the privacy status of the lock 106. Such a notification may be provided to the user 108 for receiving a confirmation from the user 108 for activating the privacy status of the lock 106. On receiving the confirmation from the user 108, the user device 110 may transmit the busy status of the user 108 to the lock 106.

The present invention further encompasses the application in the user device 110 to ask the user 108 to specify/provide a time duration for activating the privacy status during the time duration as specified by the user 108. Then, the application in the user device 110 may receive an input from the user 108 to specify the time duration (such as, 30 minutes) for activating the privacy status of the lock 106. Accordingly, the user device 110 may transmit the time duration to the lock 106 along with the busy status of the user 108.

When the lock 106 receives the busy status of the user 108 and/or the time duration from the user device 110, the lock 106 may activate the privacy status of the lock 106 for indicating the busy status of the user 108. In an exemplary embodiment, the lock 106 may activate the privacy status of the lock 106 by providing a notification to other users using light emitting diode/s (LEDs) indicator/s provided on the lock 106. For an instance, red color LED may be activated (or turned-on) by the lock 106 to indicate the busy status of the user 108 to the other users outside the premises 102 trying to access the premises 102. Further, the LED indicator may blink or may continuously glow till the expiration of the time duration to indicate the busy status of the user 108 to other users. In another exemplary embodiment, the lock 106 may activate the privacy status of the lock 106 by providing a notification to the other users outside the premises 102 using voice alert/s. For an instance, a voice alert like "User inside the room is busy for next 30 minutes. Please come after 30 minutes" may be provided by the lock 106 to indicate the busy status of the user 108 to the other users outside the premises 102 trying to access the premises 102. In addition, the lock 106 may display also time left for expiration of the time duration after which the user 108 may not be busy and the other user can access the premises 102. For an instance, a timer showing time left for expiration of the time duration may be present on the lock 106. This embodiment of the present invention provides a technical advantage of automatically indicating other people outside a premises for not disturbing a user present inside the premises. This embodiment of the present invention provides a technical advantage of automatically indicating other people outside a premises that the user present inside the room is currently busy.

Furthermore, the activation of the privacy status by the lock 106 may further comprise engaging a privacy knob with the lock 106. The privacy knob may be associated with the lock 106. The engagement of the privacy knob would restrict the other users from physically accessing/opening the door 104 of the premises 102 when the privacy status is activated on the lock 106. Further, the privacy knob would be engaged with the lock 106 till the expiration of the time duration during which the privacy status is activated. After the expiration of the time duration, the privacy knob would be dis-engaged. Such engagement and dis-engagement of the privacy knob may be automatically done after the lock 106 activates the privacy status on the lock 106. Alternatively, the engagement and dis-engagement of the privacy knob may be done by the user 108.

The present invention also encompasses to remove/de-activate the privacy status of the lock 106 for indicating that the user 108 is not busy anymore and thus the busy status of the user 108 is not valid or applicable anymore. Further, after the expiration of the time duration for indicating the busy status of the user 108, the LEDs indicator/s provided on the lock 106 would automatically become deactivated. Similarly, another voice alert like "User inside the room is not busy" may be provided by the lock 106 to indicate a non-busy status of the user 108 to the other users outside the premises 102. Furthermore, the lock 106 may also display on the timer that the time duration for indicating the busy status of the user 108 has been expired and thus, the user 108 is not busy and the other user can access the premises 102.

Figure 2:
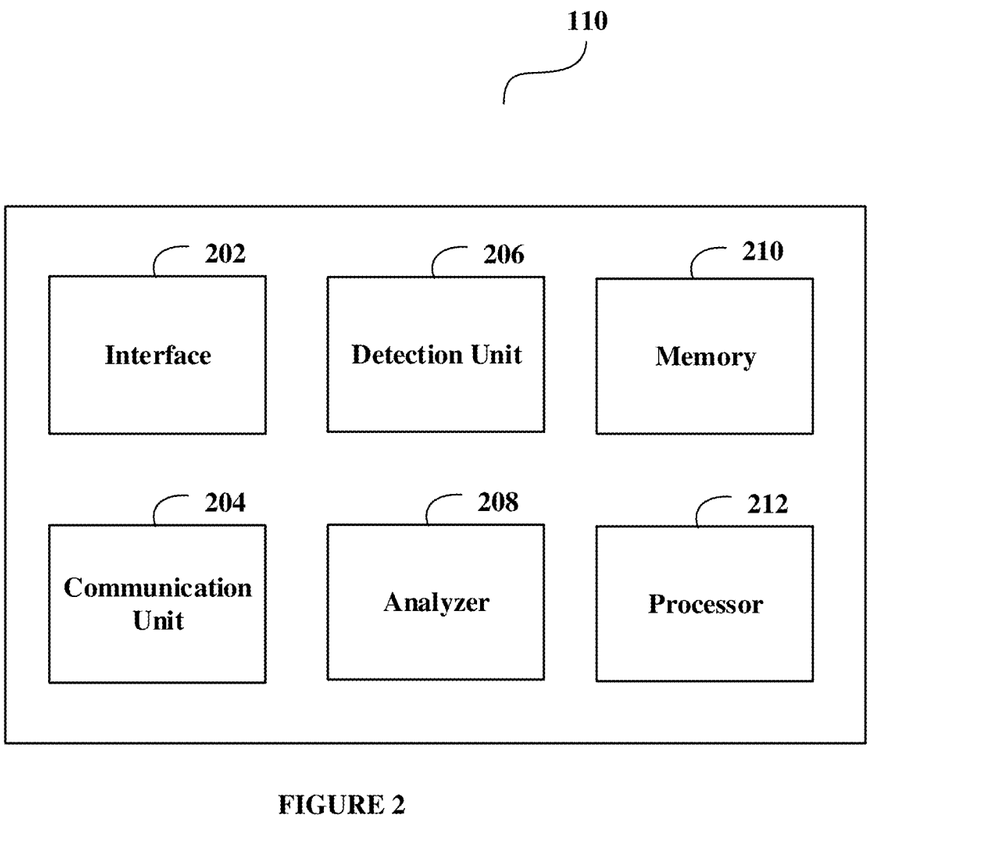
FIG. 2 depicts block diagram of different components of an exemplary user device according to an exemplary embodiment of the invention.

FIG. 2 depicts a block diagram of different components of a user device 110 according to an exemplary embodiment of the invention. The user device 110 may comprise of, but is not limited to, an interface 202, a communication unit 204, a detection unit 206, an analyzer 208, a memory 210 and/or a processor 212. The detection unit 206 may be an accelerometer and/or a global positioning system adapted to sense and capture information of sleeping activity of a user 108. The detection unit 206 may be a motion sensor and/or an inertial sensor adapted to sense and capture information of eating activity and meeting activity of the user 108 as explained above. The detection unit 206 may be a touch sensor adapted to sense and capture information of do not disturb set by the user 108 as explained above. The detection unit 206 may communicate the captured activities information to the analyzer 208. The analyzer 208 may be adapted to analyze the captured activities information of the user 108 to determine a busy status of the user 108 as explained above. The analyzer 208 may communicate the busy status of the user 108 to the communication unit 204. The communication unit 204 may be adapted to transmit the busy status of the user 108 and/or a time duration to a lock 106 for activating the privacy status of the lock 106 as explained above. In an exemplary embodiment, the communication unit 204 may be a transceiver. The interface 202 may be adapted to provide a notification to the user 108 for activating the privacy status of the lock 106 and/or adapted to ask the user 108 to specify/provide the time duration for activating the privacy status. The memory 210 may be adapted to store application to perform operations/functions as described herein, to store the busy status of the user 108 and/or to store the time duration.

Moreover, the interface 202, the communication unit 204, the detection unit 206, the analyzer 208, and/or the memory 210 may be communicably coupled with the processor 212. The different units described herein are exemplary. The invention may be performed using one or more units. For example, the tasks executed by the interface 202, the communication unit 204, the detection unit 206, the analyzer 208, the memory 210 and/or the processor 212 may be performed by a single unit. Alternatively, a greater number of units as described herein may be used to perform the present invention.

Figure 3:
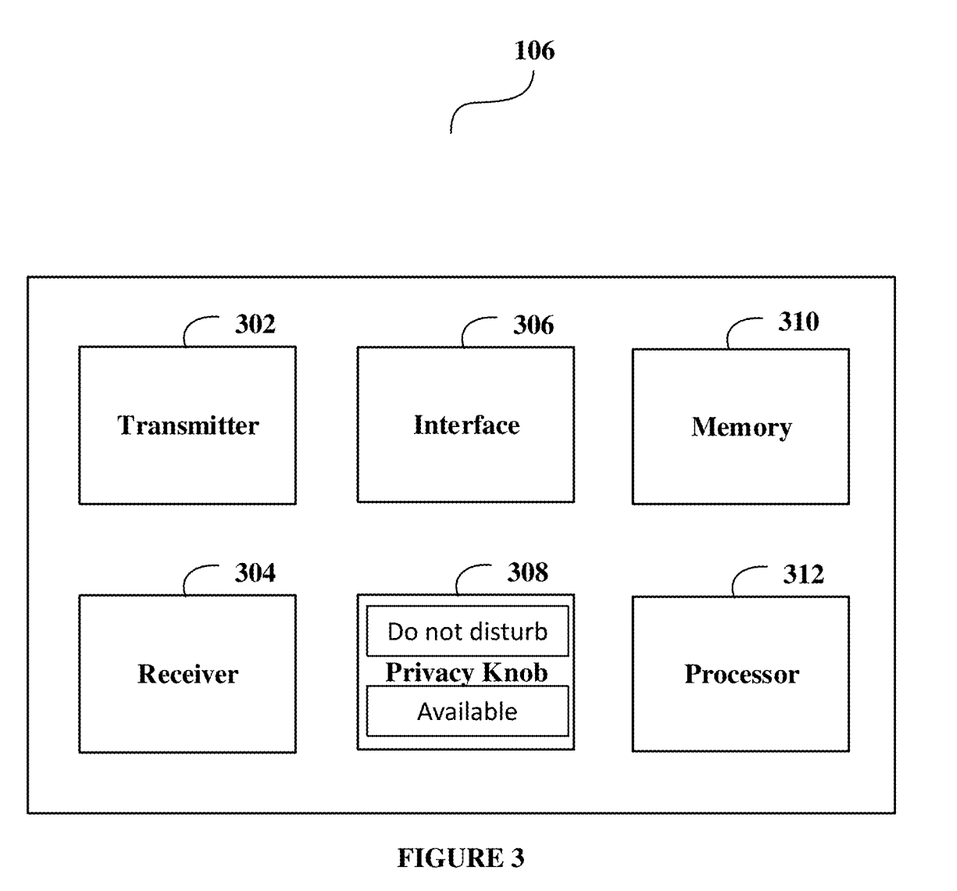
FIG. 3 depicts block diagram of different components of an exemplary lock according to an exemplary embodiment of the invention.

FIG. 3 depicts a block diagram of different components of a lock 106 according to an exemplary embodiment of the invention. The lock 106 may comprise of, but is not limited to, a transmitter 302, a receiver 304, an interface 306, an activation unit 308, a memory 310 and/or a processor 312. The receiver 304 may be adapted to receive a busy status of a user 108 and/or a time duration from a user device 110 for activating a privacy status of the lock 106 as explained above. The receiver 304 may communicate the busy status to the activation unit 308 of the lock 106. The activation unit 308 may activate the privacy status on the lock 106 using light emitting diode/s (LEDs) indicator/s and/or voice capability of the lock 106 as explained above. The interface 306 may be adapted to display time left for expiration of the time duration. The memory 310 may be adapted to store the busy status of the user 108 and/or the time duration.

Moreover, the transmitter 302, the receiver 304, the interface 306, the activation unit 308, the memory 310 may be communicably coupled with the processor 312. The different units described herein are exemplary. The invention may be performed using one or more units. For example, the tasks executed by the transmitter 302, the receiver 304, the interface 306, the activation unit 308, the memory 310 and/or the processor 312 may be performed by a single unit. Alternatively, a greater number of units as described herein may be used to perform the present invention.

Figure 4:
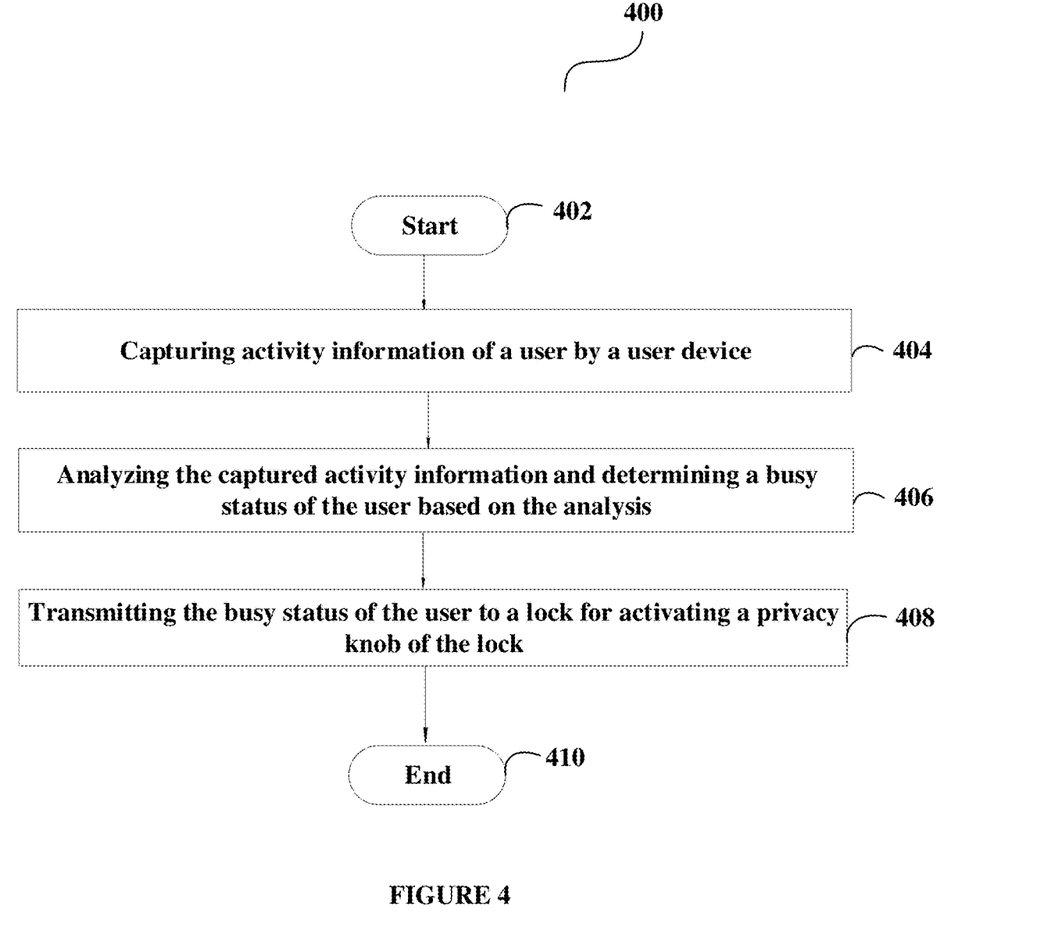
FIG. 4 depicts an exemplary flowchart illustrating a method to perform the invention according to an exemplary embodiment of the invention.

FIG. 4 depicts a flowchart outlining the features of the invention in an exemplary embodiment of the invention. The method flowchart 400 describes a method being for activating a privacy status of a lock. The method flowchart 400 starts at step 402.

At step 404, a user device 110 may capture activity information of a user 108 when the user 108 is involved in any activity. This has been discussed above in FIGS. 1A-1E in greater details.

At step 406, an application in the user device 110 may analyze the captured activity information and determining a busy status of the user 108 based on the analysis. This has been discussed above in FIGS. 1A-1E in greater details.

At step 408, the user device 110 may transmit the busy status of the user 108 to a lock 106 for activating a privacy status of the lock 106. This has been discussed above in FIGS. 1A-1E in greater details. Then, the method flowchart 400 may end at 410.

The present invention is applicable to various fields/industries such as, but not limited to, hospitality industry, real-estate industry, hostels, educational institutes, banking sector, automobile industry, and any such field/industry where the lock can be used and is obvious to a person skilled in the art.

In one embodiment of the invention, the invention can be operated using the one or more computer readable devices. The one or more computer readable devices can be associated with a user device 110. A computer readable medium comprises one or more processors and a memory coupled to the one or more processors, the memory stores instructions executed by the one or more processors. The one or more processors configured to capture activity information of a user 108 by a user device 110. The one or more processors configured to analyze the captured activity information and determining a busy status of the user 108 based on the analysis. The one or more processors configured to transmit the busy status of the user 108 to a lock 106 for activating a privacy status of the lock 106.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A user device comprising:
    a detection unit adapted to capture activity information of a user;
    an analyzer adapted to analyze the captured activity information and determine a busy status of the user based on the analysis; and
    a communication unit adapted to transmit the busy status of the user to a lock for activating a privacy knob of the lock, wherein the privacy knob indicates to people outside a premises to not disturb the user present inside the premises.

2. The user device of claim 1, wherein the detection unit captures the activity information automatically using one or more sensors placed inside or outside the user device.

3. The user device of claim 1, wherein the activity information comprises gestures by the user applied on the user device.

4. The user device of claim 1, wherein the analyzer is adapted to determine the busy status associated with the user when the user device is set in do-not-disturb mode.

5. The user device of claim 1, wherein the analyzer is adapted to determine the busy status associated with the user based on sleeping activity information of the user using an accelerometer of the user device or sound waves emitted by the user device.

6. The user device of claim 1, wherein the lock receives the busy status from an occupancy sensor, wherein the occupancy sensor determines the busy status associated with the user based on an occupancy activity information of the user.

7. The user device of claim 1, wherein the lock is located on a door of a premises and the user is present inside the premises.

8. The user device of claim 1, wherein the lock provides notification to other users accessing a premises to alert the other users regarding the busy status of the user using a voice alert and/or a light emitting diode (LED) indicator.

9. The user device of claim 1, wherein the user device is adapted to provide a notification to the user for activating the privacy knob before transmitting the busy status to the lock.

10. The user device of claim 1, wherein the user device is adapted to receive a time duration from the user for activating the privacy knob during the time duration specified by the user.

11. The user device of claim 10, wherein the lock receives the time duration from the user device for activating the privacy knob, wherein the lock comprises an interface to a display time left for expiration of the time duration.

12. The user device of claim 1, wherein the activation of the privacy knob of the lock comprises engaging the privacy knob with the lock.

13. A method comprising:
    capturing activity information of a user by a user device;
    analyzing the captured activity information and determining a busy status of the user based on the analysis; and
    transmitting the busy status of the user to a lock for activating a privacy knob of the lock, wherein the privacy knob indicates to people outside a premises to not disturb the user present inside the premises.

14. The method of claim 13, wherein the user device captures the activity information automatically using one or more sensors placed inside or outside the user device.

15. The method of claim 13, wherein the activity information comprises gestures of the user applied on the user device, wherein the gestures comprise moving the user device by the user in a predefined manner.

16. The method of claim 13, wherein the user device determines the busy status associated with the user when the user device is set in do-not-disturb mode.

17. The method of claim 13, wherein the user device is adapted to determine the busy status associated with the user based on a sleeping activity information of the user using an accelerometer of the user device or sound waves emitted by the user device.

18. The method of claim 13, wherein the lock receives the busy status from an occupancy sensor, wherein the occupancy sensor determines the busy status associated with the user based on an occupancy activity information of the user.

19. The method of claim 13, wherein the lock is located on a door of a premises and the user is present inside the premises, wherein the lock provides notification to other users accessing a premises to alert other users regarding the busy status of the user using a voice alert and/or a light emitting diode (LED) indicator.

20. A system comprising:
a user device comprising:
a detection unit adapted to capture activity information of a user;
an analyzer adapted to analyze the captured activity information and determine a busy status of the user based on the analysis; and
a communication unit adapted to transmit the busy status of the user to a lock for activating a privacy knob of the lock; and
the lock comprising:
a receiver adapted to receive the busy status of the user from the user device; and
an activation unit adapted to activate the privacy knob of the lock based on the busy status of the user, wherein the privacy knob indicates to people outside a premises to not disturb the user present inside the premises.

* * * * *